United States Patent [19]

Ihrig et al.

[11] 3,992,491
[45] Nov. 16, 1976

[54] ROTATING GAS DIFFUSER

[75] Inventors: David C. Ihrig; Jack L. Cooley; Michael W. Boex, all of Littleton, Colo.

[73] Assignee: FMC Corporation, Chicago, Ill.

[22] Filed: Sept. 30, 1975

[21] Appl. No.: 618,080

[52] U.S. Cl.............................. 261/87; 261/DIG. 71; 416/181; 416/231 R
[51] Int. Cl.².......................................... C02C 5/04
[58] Field of Search...................... 261/87, DIG. 71; 209/169; 210/15, 63 R, 220, 221 R; 416/181, 231, 233

[56] References Cited
UNITED STATES PATENTS

| | | | |
|---|---|---|---|
| 880,506 | 3/1908 | Clawson | 209/169 |
| 1,242,445 | 10/1917 | Ittner | 209/169 |
| 1,374,446 | 4/1921 | Greenawalt | 209/169 |
| 3,630,498 | 12/1971 | Bielinski | 261/87 |
| 3,650,513 | 3/1972 | Werner | 261/87 |

*Primary Examiner*—Tim R. Miles
*Assistant Examiner*—Gregory N. Clements

[57] ABSTRACT

A rotating gas diffuser for shearing fine gas bubbles from the surface thereof when the diffuser is immersed in a body of liquid and rotated therein. The rotatable shaft of the diffuser may carry a plurality of main rigid structural spokes and an equal number of rigid hollow gas feed conduits positioned alternately around the shaft. A plurality of plates, each in the form of a section of an annulus with its lateral edges radially positioned with respect to the circular rotating gas diffuser, is supported either on the top or the bottom of the diffuser, or on both, near its perimeter. Each porous plate is carried by a plate holder that has a shape similar to its associated porous plates, and with those plates defines a gas plenum having an area substantially equal in extent to, but no greater than, the area of the plates. The lateral edges of the plate holders are releasably secured to the gas diffuser, and at least one lateral edge of each plate holder is movable initially in a direction normal to the plane of the rotating gas diffuser when its associated securing means is released. Other construction details of the rotating gas diffuser are disclosed.

42 Claims, 19 Drawing Figures

U.S. Patent  Nov. 16, 1976  Sheet 1 of 3  3,992,491
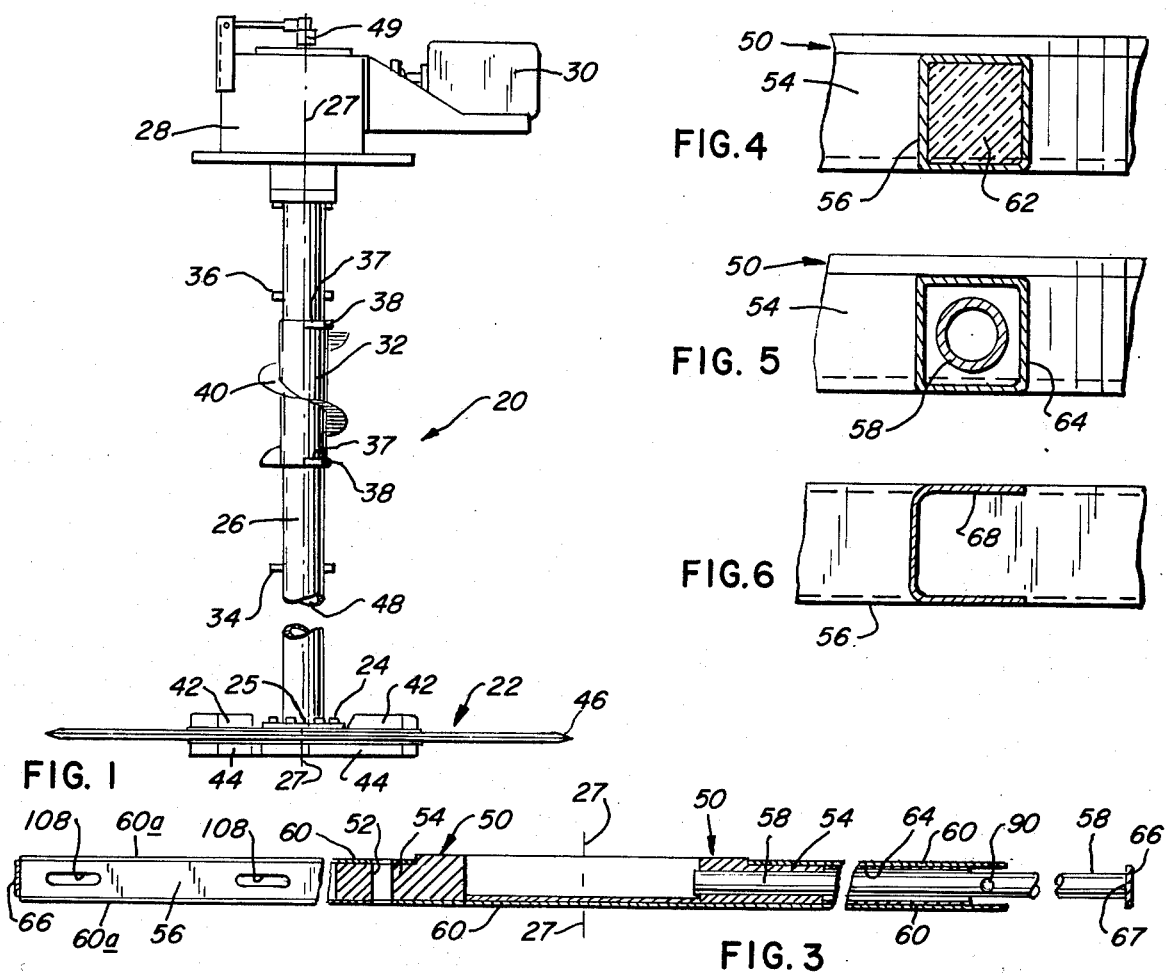
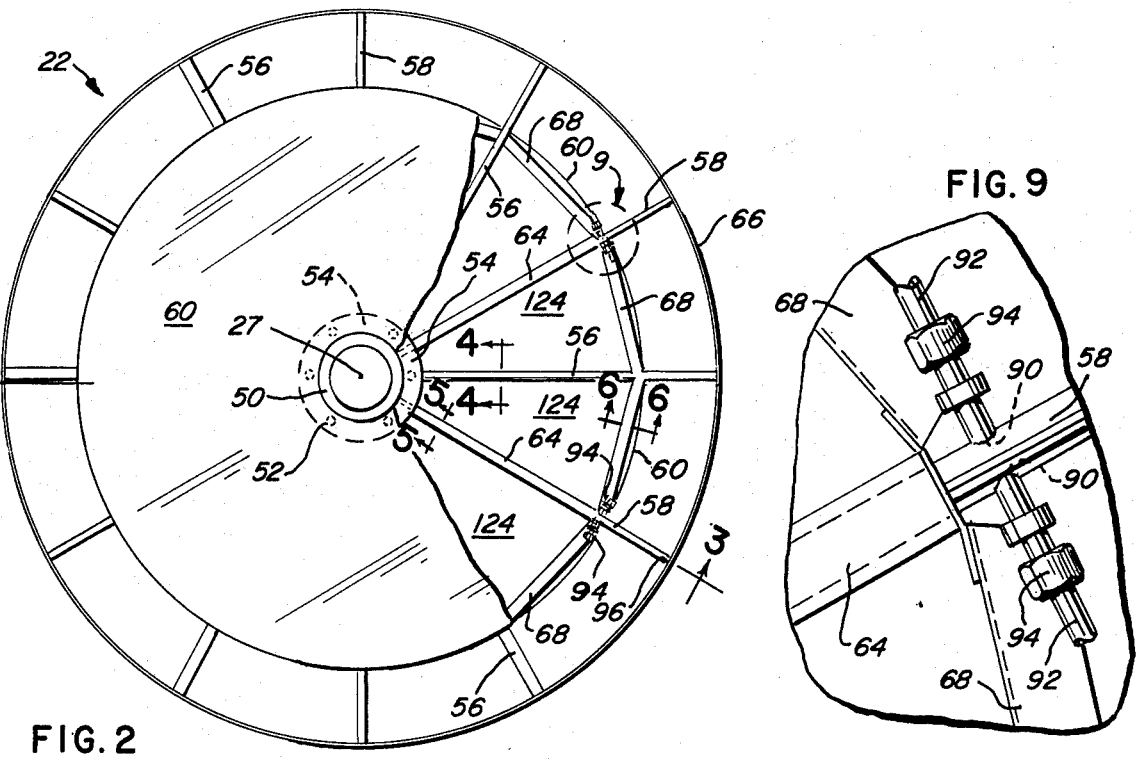

U.S. Patent  Nov. 16, 1976  Sheet 2 of 3  3,992,491
FIG. 7
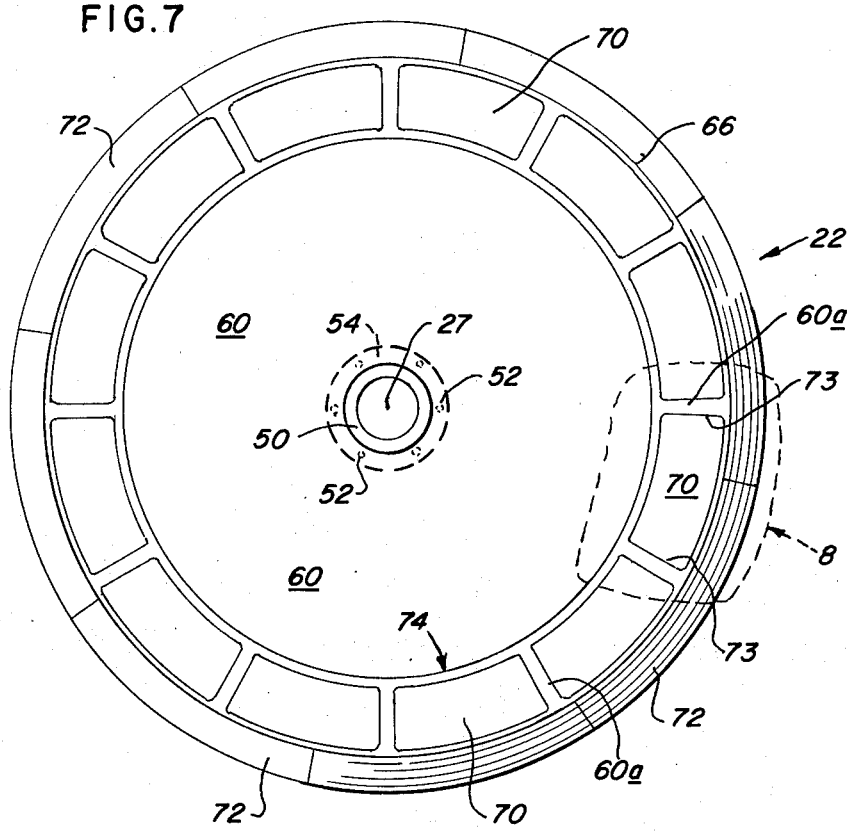
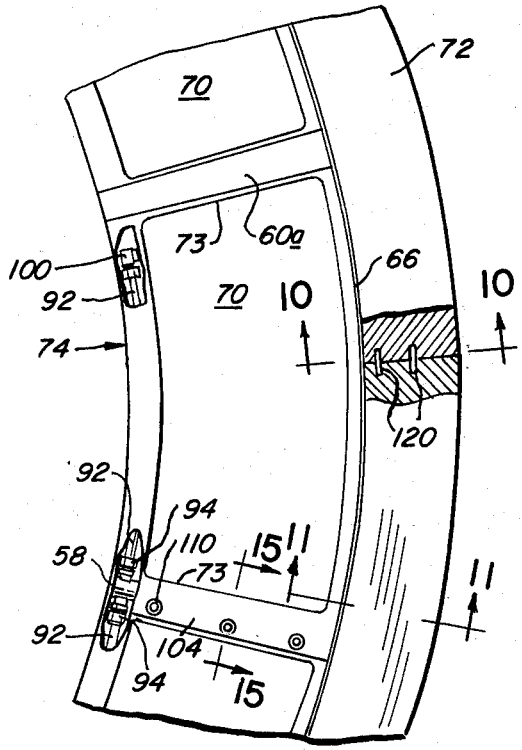
FIG. 8
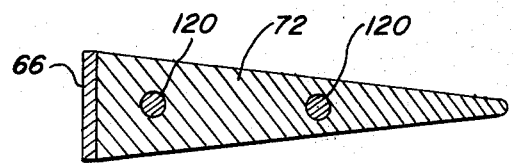
FIG. 10
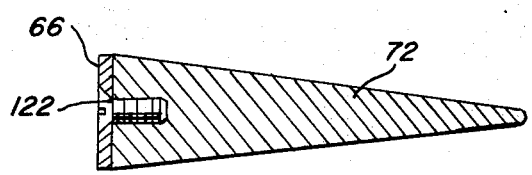
FIG. 11

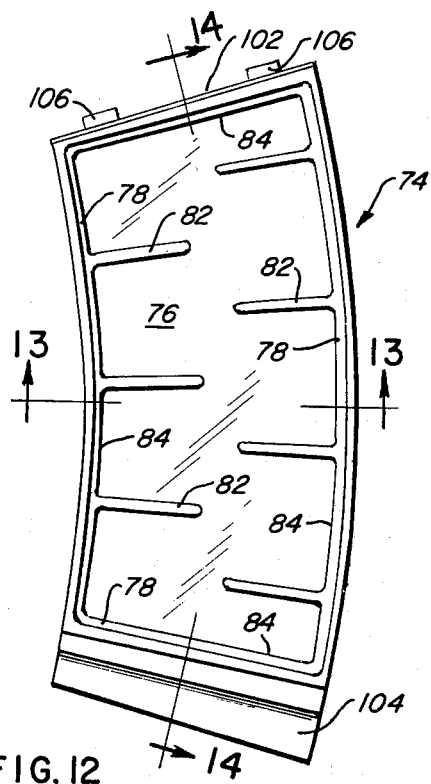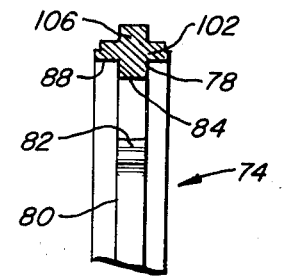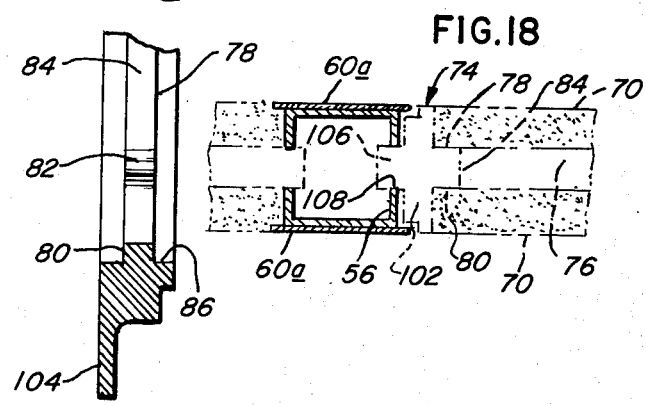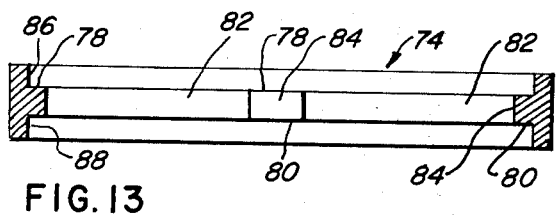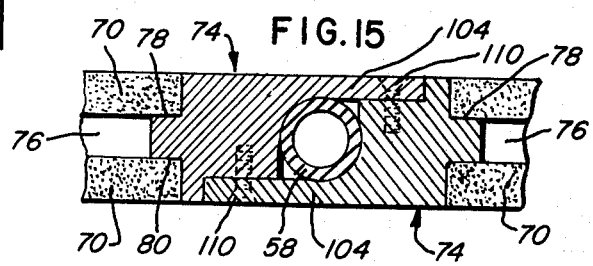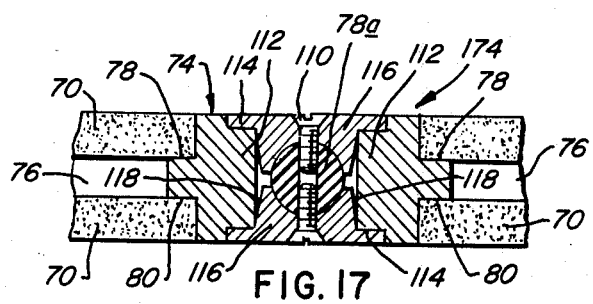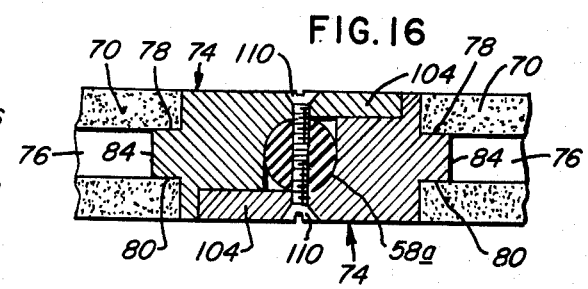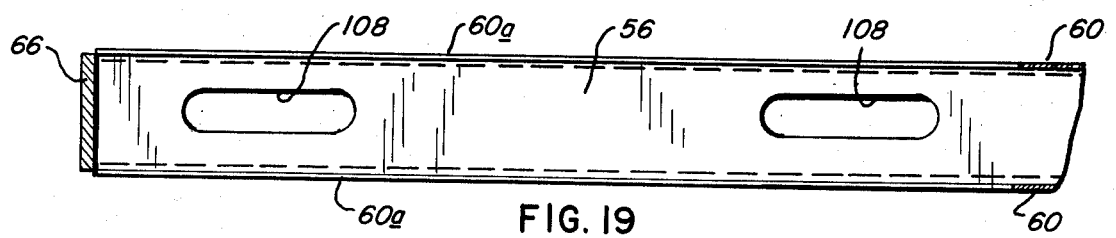

ROTATING GAS DIFFUSER

This invention relates to bubble shearing apparatus, and in particular to a rotating gas diffuser for shearing fine gas bubbles from the surface thereof when the diffuser is immersed in a body of liquid and rotated therein.

BACKGROUND OF THE INVENTION

Gas diffusers designed to produce fine gas bubbles in a body of liquid through the process of bubble shearing have been known for some time. U.S. Pat. No. 3,650,513 issued to Werner on Mar. 21, 1972 provides one of the most recent examples of such bubble shearing apparatus, in the form of a rotating disk with porous surfaces on both the top and the bottom of the disk.

The rotating gas diffuser disclosed in the Werner patent just referred to has several structural features that seriously limit the overall size of the apparatus, as well as the pressure at which the gas to be introduced into the body of liquid being treated can be fed into the gas diffuser. Both of these limitations greatly restrict the usefulness of a rotating gas diffuser in bubble shearing. A large diameter of, say, 4 to 10 feet and a gas pressure in the range of 10 to 30 p.s.i. above the hydrostatic pressure at the depth at which the bubble shearing diffuser is to be operated are both very desirable. The larger the diameter of the rotating gas diffuser, the greater the potential area of the porous surfaces on the rotating disk diffuser, and thus the greater the likelihood that a desirably high gas flow rate, such as for example 1500 lbs. per day, can be achieved. Operating pressures of 10 to 30 p.s.i.g. are required to produce the desired gas flow rate through typical porous materials, such as ceramic tile, that are suitable for incorporation in a rotating gas diffuser.

If an open, unobstructed chamber such as the chamber disclosed in the Werner patent is constructed, for example, with a 7 foot diameter, both the upper wall and the lower wall of the chamber would be subjected to a total force of about 110,000 pounds if the apparatus is operated at a gas pressure of 20 p.s.i. above the surrounding hydrostatic pressure. Even a disk constructed with steel plates ¾ inch thick on both the top and bottom of the chamber would fail under this pressure if there were no internal supports. If the structure were strengthened to withstand the indicated gas pressure, the resulting weight of the rotating diffuser would be so great that the critical speed of the shaft (i.e., the speed at which the first harmonic frequency of the rotating body would result in undesirable vibration, which speed is a function of the mass suspended from the shaft) would be much lower than the speed of rotation at which such a bubble shearing apparatus should desirably be operated. To avoid this result, a rotating gas diffuser of the indicated design would have to be constructed of a much smaller size, or operated at a much lower gas pressure, than is desirable.

Another disadvantage of an open, unobstructed gas chamber such as the chamber disclosed in the Werner patent stems for the large total volume of the chamber. When any rotating gas diffuser loses internal pressure for some reason, the gas chamber will unavoidably flood. Whatever water comes into the chamber during such flooding must be included as part of the mass of the rotating disk when the critical speed of the rotating diffuser shaft is determined. It is true that the major portion of the water will probably be blown out of the gas chamber when the chamber is again raised to its operating pressure, but in the meantime extensive damage could occur if the diffuser was rotated and the critical speed of the shaft was reached while the temporary heavy flooding condition continued. This problem is greatest with an internal gas chamber that extends throughout the full volume of the rotating gas diffuser, as in the Werner prior art apparatus.

Still another disadvantage of the Werner diffuser disclosed in his FIGS. 1–6 arises from the fact that the gas plenum extends radially outward under the non-porous annular periphery of the disk there shown. If the gas plenum floods because of loss of internal pressure as just described, when rotation of the disk is resumed a certain quantity of the water cannot be blown out through the porous part of the walls of the gas plenum because it is caused by centrifugal force to move into the space beneath the non-porous, tapered perimeter of the disk, and is trapped there. The increased weight of the disk due to the presence of this permanently trapped water will therefore continue to affect the critical speed of the diffuser shaft.

All these disadvantages found in the prior art are eliminated by the rotating gas diffuser of the present invention.

SUMMARY OF THE INVENTION

In the rotating gas diffuser of this invention, the gas plenum underlying an individual porous plate on the surface of the rotating disk like member of the apparatus (each of which plates provides a porous material through which gas is passed to form nascent bubbles that are then sheared away as the disk rotates in the liquid in which it is immersed) extends through an area substantially equal only to the area of the porous plate. By thus limiting the gas plenums to this greatly reduced volume, several important advantages are achieved. The total force exerted on the porous plates by the gas introduced into the gas plenums under pressure is greatly reduced, and therefore a disk of much lower structural strength and weight for a desirably large diameter disk can be employed, which in turn will permit a desirably high rotation speed. Any unavoidable flooding that may occur will involve a much lower volume of water, which will minimize the impact of temporarily trapped water on the critical speed of the rotatable shaft of the disk diffuser. In addition, the permanent trapping of any quantity of water around the perimeter of the disk will be avoided, which will further minimize the impact on shaft critical speed due to water that may leak into the plenum.

It is theoretically possible to make all the internal spaces in the rotating disk like member of this gas diffuser except for the gas plenums watertight so that no water can leak into those spaces to add to the weight of the rotating disk and adversely affect the critical speed of rotation of the diffuser shaft. However, as a practical matter, it is difficult to insure that all such spaces will be watertight. A second feature of the rotating gas diffuser of this invention meets this problem by substantially filling all spaces located radially inward of the gas plenums of the apparatus that are not already occupied by structural elements of the diffuser or by the main gas feed line with a lightweight material of relatively low density in comparison to the material of which the main structural elements of the apparatus are formed, which material is substantially resistant to the introduction of water into any space occupied by the material. In addition, in a preferred embodiment of this invention, an angular member of tapered cross section is affixed to the gas diffuser radially outward of the porous plates, with its thickest portion positioned adjacent the porous plates, and this member is also formed of a material of relatively low density that is substantially resistant to the taking up of water.

Another important feature of the rotating gas diffuser of this invention is the relatively small angular width of each porous plate (having the shape of a section of an annulus with its lateral edges radially aligned with the rotating disk) that is included in the porous surface through which gas passes as the diffuser rotates. Since the largest possible porous surface at the desired distance from the center of rotation of the rotating gas diffuser will produce the highest gas flow rate for a given power input, good design would seem to suggest that each porous plate have as great an angular width as possible. Thus, in the disk diffusers disclosed in the Werner patent referred to above, a total of only four (FIGS. 3 and 6) or eight (FIG. 7) porous plates is employed, permitting a theoretical maximum angular width for each plate of something less than 90° in the first embodiment and something less than 45° in the second embodiment.

In contrast to this, an improved form of the gas diffuser of this invention employs a minimum of twelve porous plates, making the theoretical maximum angular width of each porous plate something less than 30°. Although this reduces the total area of the available porous surface lying between two given distances from the center of the rotating gas diffuser, it markedly increases the reliability of the apparatus by reducing the risk of cracking the porous plates (which are typically formed of ceramic tile) because of the increased stresses on the plate that would result from greater angular widths. In addition, the narrower angular width of each porous plate makes it possible for the plate to be quite thin without rendering it too fragile, and this in turn makes it possible to keep the rotating disk like member of the diffuser much thinner than it would otherwise be, with a resulting marked improvement in the performance of the apparatus.

Still another important feature of the rotating gas diffuser of this invention is useful whenever it becomes necessary, because of cracking or other damage, to replace any of the porous plates included in the apparatus. This feature includes means for releasably securing to the gas diffuser both lateral edges of each plate holder that carries a porous plate, at least one of the lateral edges of the plate holder being initially movable in a direction normal to the plane of the diffuser when the securing means is released. Because of this construction, the plate holer, its associated porous plates on the top and bottom of the diffuser, and any other member defining the gas plenum associated therewith can all be rotated simulatneously out of the plane of the gas diffuser when desired, and the other lateral edge of the plate holder can then be disengaged from th gas diffuser.

In one embodiment, the lateral edges of two adjacent plate holders are initially movable in opposite directions normal to the plane of the gas diffuser. The securing means for these lateral edges can include means threadably securing the edge in question to the basic supporting structure of the rotating gas diffuser. Or, if desired, the plate holders can be arranged with the lateral edges referred to positioned on opposite sides of one of the radially extending basic structural elements of the diffuser, with the plate holder edges enclosing that basic structural element and threadably secured to each other instead of to the structural element. In the same enbodiment, the other lateral edge of each plate holder carries a plurality of tabs which are inserted in complementary openings in the basic supporting structure of the gas diffuser.

All the features mentioned cooperate to provide a highly efficient and easily maintained rotating gas diffuser.

BRIEF DESCRIPTION OF DRAWINGS

The invention will now be described by reference to the accompanying drawing, in which:

FIG. 1 is a side elevation of one embodiment of a rotating gas diffuser according to this invention, with a portion of the rotating shaft omitted to conserve space;

FIG. 2 is an enlarged top plan view of the rotating disk like member of the embodiment of FIG. 1, partially broken away and with the tapered outer portion, the porous plates, and the porous plate holders, as well as the impeller vanes carried on the top of the disk like member, omitted for clarity;

FIG. 3 is an enlarged fragmentary sectional view taken generally along line 3—3 of FIG. 2;

FIGS. 4, 5 and 6 are further enlarged sectional views taken generally along lines 4—4, 5—5, and 6—6, respectively, of FIG. 2;

FIG. 7 is an enlarged top plan view of the rotating disk like member of the embodiment of FIG. 1, with the impeller vanes on the top of the disk like member omitted for clarity;

FIG. 8 is an enlarged plan view, partly broken away, of portion 8 of the rotating disk like member of FIG. 7;

FIG. 9 is an enlarged plan view of portion 9 of FIG. 2;

FIGS. 10 and 11 are enlarged sectional views of the tapered annular perimeter of the disk like member of FIGS. 7 and 8, taken generally along lines 10—10 and 11—11, respectively, of FIG. 8;

FIG. 12 is an enlarged top plan view of the plate holder underlying the porous plate shown in FIG. 8;

FIG. 13 is a further enlarged sectional view of the plate holder of FIG. 12, taken generally along line 13—13 of that figure;

FIG. 14 is a similarly enlarged, fragmentary view of the plate holder of FIG. 12, taken generally along line 14—14 of that figure;

FIG. 15 is an enlarged sectional view taken generally along line 15—15 of FIG. 8, showing how adjacent plate holders such as illustrated in FIGS. 12 to 14 can be secured around a radially extending structural member of the rotatable disk member of FIG. 2;

FIGS. 16 and 17 are views similar to FIG. 15, and show alternative modes of securing porous plate holders to a radially extending structural member of the rotatable disk like member of FIG. 2; and FIG. 19 is an enlarged showing of the extreme left-hand portion of FIG. 3.

DETAILED DESCRIPTION OF THE APPARATUS OF THIS INVENTION

General Construction

FIG. 1 is a side elevation view of one embodiment of the bubble shearing rotating gas diffuser of this invention. Rotating gas diffuser 20 includes disk like member 22 rigidly attached by a plurality of bolts 24 to central ring 25 which is welded to hollow shaft 26. Shaft 26, rotatable around axis 27—27, is driven through gear reducer 28 by electric motor 30, both of which are mounted above the normal level of the body of liquid in which rotating gas diffuser 20 is immersed. Electric motor 30 is preferably a variable speed motor.

Rotatable shaft 26 is shown broken away to indicate that disk like member 22 is normally located some 12 to 14 feet below the surface of the body of mixed liquor — contained for example in the aeration tank of a conventional activated sludge sewage treatment plant — into which fine gas bubbles are to be introduced by rotation of disk like member 22.

Sleeve 32 is adapted to be secured by means of attaching clamps 37 and associated bolts 38 to shaft 26 at a predetermined depth in the zone lying between two stops, lower stop 34 and upper stop 36, which are carried by the shaft. Sleeve 32 carries helical float submerging screw 40, so that when shaft 26 is rotated screw 40 tends to cause any "float" present — in the form of intermixed air bubbles and suspended solid particles on top of the liquid contents of the tank with which rotating gas diffuser 20 is employed — to be submerged beneath the surface of the liquid.

Circulation of the liquid contents directly above rotatable disk like member 22 is effected by means of impeller vanes 42 carried on the top of member 22. A similar movement of the liquid contents of the tank lying directly beneath rotatable disk member 22 is accomplished by impeller vanes 44 carried on the bottom of member 22. In this manner impeller vanes 42 and 44, both of conventional construction, help maintain in suspension in the liquid contents of the tank any solid particles suspended in the liquid.

Rotatable disk like member 22 of the embodiment of the rotating gas diffuser of this invention illustrated in FIG. 1 has an outside diameter of about 7 feet, which is approximately 55 times the maximum thickness of the disk like member in its bubble shearing area. The perimeter of member 22 is tapered at 46 to a thickness of about 1/16 inch.

As indicated above, rotatable shaft 26 is hollow. The hollow shaft defines main feed line 48, into which gas that is to be introduced into the body of liquid being treated is fed, through rotatable connection 49, from a source of compressed gas (not shown).

Supporting Structure

The basic supporting structure for rotatable disk like member 22 is best seen in FIG. 2. Hub plate 50 has bolt holes 52 to receive the bolts by which it is affixed to central ring 25 carried by rotatable shaft 26. Bolt plate 50 has outwardly extending shoulder 54 to which in the embodiment of FIG. 2 are attached six main rigid structural spokes 56 extending radially outwardly therefrom. An equal number of rigid hollow gas feed conduits 58 are likewise attached to hub plate 50 extending radially outward between spokes 56. Spokes 56 and feed conduits 58 may be formed of any strong material such as steel or some other structurally stable material.

A larger number of spokes 56 and feed conduits 58 may be employed, if for example it is desired to decrease the thickness of the porous plates or increase the overall diameter of the apparatus. The need to minimize the risk of cracking the porous plates might then outweigh the loss of gas diffusing surface due to the larger number of nonporous areas lying between the increased number of plates.

A smaller number of structural spokes 56 may also be used, although for stability a minimum of three is required. If desired, separate hollow members 58 need not be employed. The exterior portion of spokes 56 will then provide structural support for disk like member 22, and the interior portion thereof can constitute the radially extending gas conduit means.

As seen in FIG. 4, each main structural spoke 56 in this embodiment is square in external cross section to provide flat top and bottom surfaces of substantial area to which skin means 60 can be affixed. If desired, the interior of each structural spoke 56 may be filled with a lightweight solid material 62.

As seen from FIG. 5, each hollow gas feed conduit 58 is circular in cross section, and in the embodiment shown is enclosed in a supplementary rigid, hollow structural spoke 64 of square external cross section that is affixed to hub plate 50 and extends radially outwardly therefrom. These supplementary structural spokes, formed of metal or some other suitably strong material, provide additional flat top and bottom surfaces of substantial area to which skin means 60 can be affixed. Each feed conduit 58 extends outward beyond the hollow structural spoke within which it is positioned, to provide an outer plate supporting portion which helps to carry, in a manner to be described below, the members that provide the gas diffusing surface for this bubble shearing apparatus.

Circular hoop 66 is secured to the outer end of main structural spokes 56 and hollow gas feed conduits 58 to impart rigidity to this arrangement of radially extending basic structural members. In addition, brace members 68 extend between each pair of an adjacent main structural spoke 56 and supplementary hollow structural spoke 64, located approximately three-quarters of the distance from axis of rotation 27 to circular hoop 66. Brace means 68 may be channel members such as shown in cross section in FIG. 6, which provide additional flat top and bottom surfaces to which skin means 60 can be affixed.

Skin means 60 may be formed of any suitable material such as stainless steel of a thickness of approximately 0.050. The skin means is annular in shape, extending from hub plate 50 at its center outward approximately three-quarters of the way to circular hoop 66 on both the top and bottom of disk like member 22. It covers the arrangement of spokes 56, supplementary spokes 64 containing hollow feed conduits 58 therein, and the means for affixing these radially extending members to hub plate 50, thereby providing an upper and lower surface for disk like member 22.

The structure thus far described is shown in cross section in FIG. 3, the view being taken generally along line 3—3 of FIG. 2. The cross-sectional view of FIG. 3 is broken away to indicate that a large portion of circular skin means 60, with the underlying supporting structure, is omitted. The outer end portion 67 of each hollow gas feed conduit 58 is closed by suitable means, such as circular hoop 66 in the embodiment shown.

Porous Plates

FIG. 7 is a top plan view of the complete disk like member 22, with porous plates 70 and tapered annular perimeter portion 72 in place, but with impeller vanes 42 omitted and the attachment of plates 70 to rotatable disk like member 22 shown only diagrammatically.

Each porous plate 70 has the shape of a section of an annulus with its lateral edges 73 aligned radially with the rotating gas diffuser. The material of which the porous plates are formed may be any porous medium with openings smaller than about 50 microns. Improved results are obtained with porous plates having openings of no more than about 25 microns, and the maximum pore size in the porous medium of which the plates are formed is preferably about 10 microns. Porous plates 70 may be formed, for example, of porous ceramic material, a porous sintered metal, a porous sintered plastic material, micropore stainless steel screen, or the like.

A plurality of such porous plates is carried by the previously described arrangement of main structural spokes 56 and radially extending feed conduits 58 on at least one of the top and bottom of disk like member 22. One plate is positioned on the top or bottom of member 22, and in the embodiment disclosed on both the top and bottom of member 22, between each radial gas feed conduit 58 and the immediately adjacent main structural spoke 56 lying on each side thereof.

As seen from FIGS. 2 and 7, porous plates 70 are positioned immediately inward of circular reinforcing hoop 66.

Porous Plate Holders

FIG. 12 is a top plan view of a porous plate holder 74 which supports a pair of porous plates 70, one on the top and one on the bottom of rotatable disk member 22.

In addition, plate holder 74 defines, with the upper and lower porous plates 70 supported by it, a gas plenum 76 underlying each porous plate 70 on the top of the rotating gas diffuser. Since each porous plate on top of the diffuser is supported on narrow ledge 78 which extends around the perimeter of porous plate holder 74, each gas plenum 76 underlying porous plate 70 has an area substantially equal in extent to only the operative area of its associated plate 70.

FIGS. 13 and 14 are sectional views of porous plate holder 74 taken generally along line 13—13 and 14—14, respectively, of FIG. 12. As is seen from FIGS. 13 and 14, ledge 80 extends around the bottom of the perimeter of plate holder 74 in the same manner as ledge 78 extends around the plate holder on its top side.

A plurality of supporting fingers 82 extend inwardly from shoulder 84 defined by ledges 78 and 80. Supporting fingers 82 underlie porous plates 70 and are in contact therewith; if desired, for further strength of this assembly of parts the fingers may be attached to the porous plates by a suitable binder. The outer edge portions of each porous plate 70 are in any case bonded to ledges 78 and 80, as well as surrounding walls 86 and 88, to provide a gas tight chamber or plenum 76.

Plate holder 74 may be made from any suitable material. Polyurethane has been found to be very satisfactory, since it is a strong material, yet flexible enough to withstand shock loads. In addition, it provides a good bond with porous plates formed of a typical material such as ceramic tile, and will ordinarily absorb only about 1 per cent water by weight when immersed in a body of aqueous liquid. The criteria for selection of the material from which porous plate holder 74 is to be fabricated include flexibility, strength, compatibility with the liquid environment in which the rotating gas diffuser is to be used, resistance to permanent deformation, compatibility with the adhesive employed for assembling gas plenum 76, tendency to absorb water, etc.

Gas Plenums

Each gas plenum 76 is fed compressed gas which is first introduced through main feed line 48 and then carried radially outward through hollow feed conduits 58 to openings 90 on both sides of the feed conduit (FIG. 3). As seen in FIGS. 2, 8 and 9, a pair of branch feed lines 92 extend from openings 90 in hollow feed conduit 58 through operative connections provided by suitable fittings 94. Openings 90 are positioned at a location spaced inward from closed outer end portion 67 of conduit 58.

Fitting 100 at the other end of each branch feed line 92 connects that feed line to a respective gas plenum 76 underlying the porous plates 70 positioned adjacent to and on opposite sides of gas feed conduit 58.

Means for Securing Porous Plate Holders

Each porous plate holder 74 is releasably secured at its lateral or radial edge portions 102, 104 to the basic arrangement of structural spokes 56 and radially extending feed conduits 58. For this purpose, as seen in FIGS. 12, 14 and 18, each lateral edge 102 carries a pair of tabs 106. For the same purpose, as best seen in FIGS. 3, 18 and 19, each main structural spoke 56 has a pair of complementary openings or slots 108 in each side wall of the end portion of the spoke.

When each plate holder 74 and its two associated porous plates 70 are in operative position around the outside portions of rotatable disk like member 22, tabs 106 are positioned in their respective openings 108 in the manner indicated in FIG. 18. The latter figure and FIG. 8 shown in sectional view and top plan view, respectively, skin portions 60a which are affixed to the top and bottom surfaces of main structural spokes 56 in order to provide substantially smooth top and bottom surfaces in those areas of rotating disk like member 22.

As indicated in FIG. 18, slight gaps may be left between the flush surfaces of skin member 60a and adjacent porous plate holders 74. For good hydrodynamic performance, these gaps should be no more than about 1/16 inch each in width, and it is preferable to keep this figure as low as 1/32 inch, but it is usually not necessary as a practical matter to attempt to reduce the gap to any substantially smaller size.

The other lateral edge of porous plate holder 74, edge portion 104, is releasably secured to rotatable disk like member 22 in such a manner that it is initially movalbe in a direction normal to the plane of rotating gas diffuser 20 when its associated securing means is released. FIGS. 14 and 15 and FIGS. 14 and 16 illustrate an overhanging flange construction at edge portion 104 that provides two alternative ways of securing adjacent plate holders 74 to a radially extending feed conduit 58.

In the embodiment of FIG. 15, portions of lateral edges 104 of two adjacent porous plate holders 74 surround the plate supporting portion (which in this embodiment is hollow) of the outer end of radially extending feed conduit 58. Laterally extending flanges 104 of adjacent plate holders 74 fit together in complementary fashion around feed conduit 58, and are secured to each other by screw members 110. Flange 104 on the left-hand plate holder 74 in FIG. 15 is flush with the top surface of disk like member 22, and flange 104 on the right-hand plate holder 74 is flush with the bottom surface of the disk like member.

When it is necessary to remove and replace porous plate holder 74 and its associated plates 70 on the left-hand side of FIG. 15, the two releasable securing means or screws 110 can be removed and the holder and its associated plates can be rotated clockwise out of the plane of rotating gas diffuser 20. During this initial rotation, tabs 106 on the other lateral edge of plate holder 74 rotate slightly in complementary openings 108 in main structureal spoke 56. After plate holder 74 has been moved a distance out of the plane of the gas diffuser, tabs 106 can be laterally removed from openings 108 and the other lateral edge of the plate holder thus disengaged from the gas diffuser.

The porous plate holder 74 on the right-hand side of hollow feed conduit 58 in FIG. 15 can be removed by a similar initial counterclockwise rotation, followed by a disengagement of tabs 106 from complementary openings 108 at the other lateral edge of the porous plate holder.

In the embodiment shown in FIG. 16, releasable securing means or screws 110 are inserted directly in solid outer end portion 58a of feed conduit 58, to secure the respective flanges 104 of porous plate holders 74. Each porous plate holder 74 can be removed from its respective position enclosing structural member 58a by removing its associated releasable securing means or screws 110 and rotating the plate holder initially in a counterclockwise direction, followed by disengagement of tabs 106 from complementary openings 108 in main structural spoke 56 at the other edge of the plate holder.

Another embodiment of means by which the porous plate holders can be secured in place is illustrated in FIG. 17. In this embodiment, one lateral edge of each plate holder 74 carries shoulder 112, which defines ledge 114 on both the top and bottom of the gas diffuser. Strip members 116, which are attached directly to solid outer end 78a of feed conduit 78 by releasable securing means or screws 110, confine shoulders 112 at ledges 114 on both the top and bottom of the gas diffuser.

In this embodiment, each plate holder 74 and its associated porous plates 70 may be removed from disk like member 22 when desired by removing screw means 110 and the respective confining strip 116. Side walls 118 of each confining strip 116 are beveled slightly to permit rotation of porous plate holder 74 in either the counterclockwise or clockwise direction, depending upon whether it is desired to remove the plate holder by moving it in an upward or downward direction from the rotating gas diffuser.

Tapered Perimeter Portions

Tapered perimeter portions 72 form an annular section of rotating disk like member 22 outward of circular hoop 66. The positioning of the various sections that make up annular portion 72 is best seen in FIG. 7, and their cross sectional shapes and method of attachment to each other and to hoop 66 are best seen in FIGS. 8, 10 and 11.

In the embodiment disclosed, eight tapered segments are permanently attached to each other by means of plastic pins 120. The resulting annular assembly 72 of tapered segments is attached to hoop 66 by screws 122. The thickest portion of the tapered segments is positioned adjacent porous plates 70.

Annular tapered segments 72 are preferably formed of a lightweight material of relatively low density in comparison to the material of which main structural spokes 56 and gas feed conduits 58 are constructed. The material should also be substantially resistant to the absorption or other taking up of water. Polyurethane foam has been found to be a suitable material for construction of the tapered segments.

Filler Inserts

Since it is difficult to insure that skin means 60 will be attached to shoulder 54 of hub plate 50, main structural spokes 56, supplementary structural spokes 64, and brace members 68 with watertight seals, liquid may seep into the wedge-shaped spaces defined by these members. Any such liquid will produce the undesirable results discussed above. This result is avoided in the rotating gas diffuser of this invention through use of inserts 124 which are of a shape and size to fill all spaces located between the upper and lower surfaces of disk like member 22 radially inward of gas plenums 76 exclusive of the spaces occupied by the aforementioned structural elements and main gas feed line of the diffuser (FIG. 2).

Any lightweight material of relatively low density in comparison to the material of which the main structural spokes are constructed may be used for filler inserts 124, so long as it is substantially resistant to the introduction of water into any space it occupies. Foamed glass of a closed cellular construction has been found to be especially suitable for the formation of inserts 124. A closed cell foamed glass material of this type will absorb only a very minimal amount of liquid. In addition, inserts 124 formed of this material will add to the ability of disk like member 22 to withstand the compressive pressure resulting from immersion of this rotating gas diffuser even to a very considerable depth in a body of liquid to be treated, since foam glass of this type is available commercially that is capable of withstanding as much as 100 p.s.i. compressive pressure.

With the rotating gas diffuser of this invention, a very efficient production of fine gas bubbles for diffusion through a body of liquid in which the rotating diffuser is immersed is readily achieved. The introduction of compressed gas in the main feed line 48 when disk like member 22 is rotating about axis 27—27 while immersed in the body of liquid will cause gas to flow through feed conduits 58 and branch feed lines 92 into gas plenum 76 and out through porous plates 70. This produces nascent gas bubbles on the surface of the porous plates, which are sheared off by the viscous shear forces exerted by the liquid as the diffuser rotates in the body of liquid.

The above detailed description has been given for clearness of understanding only. No unnecessary limitations should be understood therefrom, as modifications will be obvious to those skilled in the art.

What is claimed is:

1. A rotating gas diffuser for shearing fine gas bubbles from the surface thereof when the diffuser is immersed in a body of liquid and rotated therein, which comprises:

a hollow rotatable shaft, said shaft defining a main feed line for the gas to be introduced into said body of liquid;

at least six main rigid structural spokes;

means for affixing said structural spokes to said rotatable shaft in positions extending radially outward therefrom;

an equal number of rigid hollow gas feed conduits;

means to affix each of said hollow gas feed conduits to said rotatable shaft in positions extending radially outward therefrom between each pair of adjacent main structural spokes, said hollow conduits being operatively connected at their inner ends with said main gas feed line and the outer end portions of said conduits being closed;

a plurality of porous plates carried by said arrangement of main structural spokes and radially extending gas feed conduits on at least one of the top and bottom of said gas diffuser, one of said plates being positioned between each radial feed conduit and the immediately adjacent main structural spoke lying on each side thereof, each of said porous plates having the shape of a section of an annulus with its lateral edges aligned radially with the rotating gas diffuser;

means defining a gas plenum underlying each of said porous plates on the surface of said gas diffuser, each of said gas plenums extending only through an area substantially equal to the area of its associated porous plates on at least one of the top and bottom of said gas diffuser;

a pair of branch feed lines for each of said radially extending hollow gas feed conduits, one of said branch lines extending laterally on each side of said conduit, with one end of each branch line in operative connection with said feed conduit at a location spaced inward from the closed outer end portion of said conduit, leaving a plate supporting portion at the outer end of each of said conduits;

means operatively connecting the other end of each of said branch feed lines to the gas plenum underlying the porous plates positioned adjacent to and on the respective sides of said gas feed conduit; and skin means covering said arrangement of spokes, feed conduits, and affixing means to form a disk like member having an upper surface and a lower surface, said skin means extending between said rotatable shaft and said plurality of porous plates, whereby the introduction of gas into said main feed line, when the gas diffuser is rotating about is axis of rotation while immersed in said body of liquid, will cause gas to flow through said feed conduits and branch feed lines into said gas plenums and out through said porous plates to produce nascent gas bubbles on the surface of said plates, which nascent bubbles are sheared off by the viscous shear forces exerted by said liquid as the diffuser rotates in said body of liquid.

2. The rotating gas diffuser of claim 1 in which a plurality of said porous plates is carried by said arrangement of main structural spokes and feed conduits on both the top and the bottom of the gas diffuser.

3. The rotating gas diffuser of claim 1 in which all spaces located between said upper and lower surfaces of said disk like member radially inward of said gas plenums exclusive of the spaces occupied by the aforementioned structural elements and main gas feed line of the diffuser are substantially filled with a lightweight material of relatively low density in comparison to the material of which said main structural spokes are constructed, said lightweight material being substantially resistant to the introduction of water into any space occupied thereby.

4. The rotating gas diffuser of claim 3 in which said lightweight material is a foam material of closed cellular construction.

5. The rotating gas diffuser of claim 1 in which said radially extending main structural spokes are square in external cross section to provide flat top and bottom surfaces of substantial area to which said skin means is affixed.

6. The rotating gas diffuser of claim 5 in which each of said radially extending hollow gas feed conduits is enclosed is a supplementary rigid, hollow structural spoke of square external cross section, said supplementary structural spokes being affixed to said rotatable shaft and extending radially outward therefrom, to provide additional flat top and bottom surfaces of substantial area to which said skin means is affixed.

7. The rotating gas diffuser of claim 1 in which a circular reinforcing hoop is affixed to each of said radially extending structural spokes and hollow gas feed conduits immediately outward of said plurality of porous plates.

8. The rotating gas diffuser of claim 1 in which an annular member is affixed to said arrangement of main structural spokes and hollow gas feed conduits radially outward of said porous plates, said annular member being formed of a lightweight material of relatively low density in comparison to the material of which said main structural spokes are constructed, said lightweight material being substantially resistant to the taking up of water, said annular member having a tapered cross section with its thickest portion positioned adjacent said porous plates.

9. the rotating gas diffuser of claim 1 in which said means defining a gas plenum underlying each of said porous plates on the surface of said gas diffuser includes a plurality of plate holders carried by said arrangement of main structural spokes and radially extending gas feed conduits, one of said plate holders being located between each radially extending feed conduit and the immediately adjacent main structural spoke lying on each side thereof, each of said plate holders having a shape similar to the shape of its associated porous plates on at least one of the top and bottom of said gas diffuser, the rotating gas diffuser also including means for releasably securing both lateral edges of each of said plate holders to said arrangement of structural spokes and radially extending gas feed conduits, at least one of said lateral edges being initially movable in a direction normal to the plane of said gas diffuser when its associated securing means is released so that when it is necessary to remove a porous plate from the gas diffuser the plate holder, its associated porous plates, and any other member defining said gas plenum can all be rotated simultaneously out of the plane of the gas diffuser, and the other lateral edge of said plate holder can then be disengaged from the gas diffuser.

10. The rotating gas diffuser of claim 9 in which the lateral edge of each plate holder adjacent each main structural spoke carries a plurality of tabs, and the main structural spoke defines a plurality of complementary openings in which said tabs are received.

11. The rotating gas diffuser of claim 9 in which the lateral edges of said plate holders located on laterally opposite sides of each of said radially extending gas feed conduits are initially movable in opposite directions normal to the plane of said rotating gas diffuser when their associated securing means are released.

12. The rotating gas diffuser of claim 11 in which said radially extending hollow gas feed conduits are enclosed except at their outer ends in supplementary rigid, hollow structural spokes of square external cross section, said supplementary structural spokes being affixed to said rotatable shaft and extending radially outward therefrom to said plate holders, said plate supporting portion at the outer end of each of said feed conduits projecting beyond said supplementary structural spokes, the edge of each of said plate holders adjacent each such plate supporting portion having a laterally extending flange, the flange on one of said plate holders being flush with the top surface of said disk like member and the flange on the other of said plate holders being flush with the bottom surface thereof, the rotating gas diffuser also including means for releasably securing each of said plate holders to the plate supporting portion of its associated radially extending gas feed conduit.

13. The rotating gas diffuser of claim 12 in which said last mentioned securing means includes means threadably securing each of said flanges to said plate supporting portion of its associated radially extending gas feed conduit.

14. The rotating gas diffuser of claim 12 in which said last mentioned securing means releasably secures each of said outwardly extending flanges of one plate holder to the immediately adjacent plate holder.

15. A rotating gas diffuser for shearing fine gas bubbles from the surface thereof when the diffuser is immersed in a body of liquid and rotated therein, which comprises:
- a hollow rotatable shaft, said shaft defining a main feed line for the gas to be introduced into said body of liquid;
- at least six main rigid structural spokes, each of said spokes being square in external cross section;
- means for affixing said structural spokes to said rotatable shaft in positions extending radially outward therefrom;
- an equal number of rigid hollow gas feed conduits;
- means to affix each of said hollow gas feed conduits to said rotatable shaft in positions extending radially outward therefrom between each pair of adjacent main structural spokes, said hollow conduits being operatively connected at their inner ends with said main gas feed line and the outer portions of said conduits being closed;
- a plurality of porous plates carried by said arrangement of main structural spokes and radially extending gas feed conduits, one of said plates being positioned between each radial feed conduit and the immediately adjacent main structural spoke lying on each side thereof on both the top and the bottom of the gas diffuser, each of said porous plates having the shape of a section of an annulus with its lateral edges aligned radially with the rotating gas diffuser;
- a plurality of plate holders carried by said arrangement of main structural spokes and radially extending feed conduits, one of said plate holders being located between each radially extending gas feed conduit and the immediately adjacent main structural spoke on each side thereof, each of said plate holders having a shape similar to the shape of its associated porous plates on the top and bottom of the gas diffuser, said plate holder and its associated porous plates defining a gas plenum extending only through an area substantially equal to the area of its said associated porous plates;
- a pair of branch feed lines for each of said radially extending hollow gas feed conduits, one of said branch lines extending laterally on each side of said conduit, with one end of each branch line in operative connection with said feed conduit at a location spaced inward from the closed outer end portion of said conduit;
- means operatively connecting the other end of each of said branch feed lines to the gas plenum defined by the top and bottom porous plates positioned on the respective sides of said feed conduit;
- a plurality of tabs carried by the lateral edge of each of said plate holders adjacent each main structural spoke, said tabs being inserted in complementary openings defined by said structural spoke;
- a supplementary rigid, hollow structural spoke of square external cross section enclosing each of said radially extending hollow gas feed conduits, said supplementary structural spoke being affixed to said rotatable shaft and extending radially outward therefrom to said plate holders, each of said radially extending feed conduits projecting beyond its associated supplementary structural spoke to form a plate supporting portion, the lateral edge of each of said plate holders adjacent each such plate supporting portion having a laterally extending flange, the flange on one of said plate holders being flush with the top surface of the rotating gas diffuser and the flange on the other of said plate holders being flush with the bottom surface thereof;
- releasable securing means for threadably securing each of said flanges to the plate supporting portion of its associated radially extending gas feed conduit;
- skin means covering said arrangement of spokes, feed conduits, and affixing means to form a disk like member having an upper surface and a lower surface, said skin means extending between said rotatable shaft and said plurality of porous plates;
- inserts formed of a foam material of closed cellular construction, said inserts being of a shape and size to substantially fill all spaces located between said upper and lower surface members radially inward of said gas plenums exclusive of the spaces occupied by the aforementioned structural elements and main gas feed line of the diffuser;
- a circular reinforcing hoop affixed to each of said radially extending structural spokes and hollow gas feed conduits immediately outward of said plurality of porous plates; and
- an annular member affixed to said arrangement of main structural spokes and hollow gas feed conduits radially outward of said porous plates, said annular member being formed of a lightweight material of relatively low density in comparison to the material of which said main structural spokes are constructed, said lightweight material being substantially resistant to the taking up of water, said annular member having a tapered cross section with its thickest portion positioned adjacent said porous plates,
- whereby the introduction of gas into said main feed line, when the gas diffuser is rotating about is axis of rotation while immersed in said body of liquid, will cause gas to flow through said feed conduits and branch feed lines into said gas plenums and out through said porous plates to produce nascent gas bubbles on the surface of said plates, which nascent bubbles are sheared off by the viscous shear forces exerted by said liquid as the diffuser rotates in said body of liquid, and when it is necessary to remove a porous plate from the gas diffuser, the lateral edge of each of said plate holders that carries said laterally extending flange can be moved initially in a direction normal to the plane of the gas diffuser when its associated securing means is released, the plate holder, the top and bottom porous plates, and any other member defining said gas plenum can all be rotated simultaneously out of the plane of the gas diffuser, and the other lateral edge of said plate holder can then be disengaged from the gas diffuser.

16. A porous plate holder adapted to be secured to a circular disk like member of a bubble shearing rotating gas diffuser between first and second radially extending structural support elements of said disk like member, said plate holder having the shape of a section of an annulus with its lateral edges aligned radially with the annular ring of which it is a section, one lateral edge portion of said plate holder carrying means that together with complementary means on said first structural support element of said rotating gas diffuser form a male and female fit capable of being disengaged by moving one of said members lateraly with respect to the other, the other lateral edge of said plate holder carrying a projection releasably securable by threaded securing means to said second structural support element of said gas diffuser.

17. The porous plate holder of claim 16 in which said means carried by said one lateral edge portion of said plate holder comprises a plurality of tabs adapted to be inserted in complementary openings in said first radially extending structural support element of said disk like member.

18. A rotatable disk like member for use in a rotating gas diffuser for shearing fine gas bubbles from the surface of said disk like member when it is immersed in a body of liquid and rotated therein, which comprises:
a hollow central hub plate, said hub plate defining an inlet for the gas to be introduced into said body of liquid;
at least six main rigid structural spokes;
means for affixing said structural spokes to said central hub plate in positions extending radially outward therefrom;
an equal number of rigid hollow gas feed conduits;
means to affix each of said hollow gas feed conduits to said central hub plate in positions extending radially outward therefrom between each pair of adjacent main structural spokes, said hollow conduits being operatively connected at their inner ends with said gas inlet and the outer end portions of said conduits being closed;
a plurality of porous plates carried by said arrangement of main structural spokes and radially extending gas feed conduits on at least one of the top and bottom of said rotatable disk like member, one of said plates being positioned between each radial feed conduit and the immediately adjacent main structural spoke lying on each side thereof, each of said porous plates having the shape of a section of an annulus with its lateral edges aligned radially with said disk like member;
means defining a gas plenum underlying each of said porous plates on the surface of said rotatable disk like member, each of said gas plenums extending only through an area substantially equal to the area of its associated porous plates on at least one of the top and bottom of said disk like member;
a pair of branch feed lines for each of said radially extending hollow gas feed conduits, one of said branch lines extending laterally on each side of said conduit, with one end of each branch line in operative connection with said feed conduit at a location spaced inward from the closed outer end portion of said conduit, leaving a plate supporting portion at the outer end of each of said conduits;
means operatively connecting the other end of each of said branch feed lines to the gas plenum underlying the porous plates positioned adjacent to and on the respective sides of said gas feed conduit; and
skin means covering said arrangement of spokes, feed conduits, and affixing means to form an upper surface and a lower surface of said disk like member, said skin means extending between said central hub plate and said plurality of porous plates,
whereby the introduction of gas into said gas inlet in said central hub plate, when the disk like member is rotating about its axis of rotation while immersed in said body of liquid, will cause gas to flow through said feed conduits and branch feed lines into said gas plenums and out through said porous plates to produce nascent gas bubbles on the surface of said plates, which nascent bubbles are sheared off by the viscous shear forces exerted by said liquid as the disk like member rotates in said body of liquid.

19. The rotatable disk like member of claim 18 in which a plurality of said porous plates is carried by said arrangement of main structural spokes and feed conduits on both the top and the bottom of the disk like member.

20. The rotatable disk like member of claim 18 in which all spaces located between said upper and lower surfaces of said disk like member radially inward of said gas plenums exclusive of the spaces occupied by the aforementioned structural elements of the rotatable disk like member are substantially filled with a lightweight material of realtively low density in comparison to the material of which said main structural spokes are constructed, said lightweight material being substantially resistant to the introduction of water into any space occupied thereby.

21. The rotatable disk like member of claim 20 in which said lightweight material is a foam material of closed cellular construction.

22. The rotatable disk like member of claim 18 in which said radially extending main structural spokes are square in external cross section to provide flat top and bottom surfaces of substantial area to which said skin means is affixed.

23. The rotatable disk like member of claim 22 in which each of said radially extending hollow gas feed conduits is enclosed in a supplementary rigid, hollow structural spoke of square external cross section, said supplementary structural spokes being affixed to said central hub plate and extending radially outward therefrom, to provide additional flat top and bottom surfaces of substantial area to which said skin means is affixed.

24. The rotatable disk like member of claim 18 in which a circular reinforcing hoop is affixed to each of said radially extending structural spokes and hollow gas feed conduits immediately outward of said plurality of porous plate.

25. The rotatable disk like member of claim 18 in which an annular member is affixed to said arrangement of main structural spokes and hollow gas feed conduits radially outward of said porous plates, said annular member being formed of a lightweight material of relatively low density in comparison to the material of which said main structural spokes are constructed, said lightweight material being substantially resistant to the taking up of water, said annular member having a tapered cross section with its thickest portion positioned adjacent said porous plates.

26. The rotatable disk like member of claim 18 in which said means defining a gas plenum underlying each of said porous plates on the surface of said disk like member includes a plurality of plate holders carried by said arrangement of main structural spokes and radially extending gas feeding conduits, one of said plate holders being located between each radially extending feed conduit and the immediately adjacent main structural spoke lying on each side thereof, each of said plate holders having a shape similar to the shape of its associated porous plates on at least one of the top and bottom of said disk like member, the rotatable disk like member also including means for releasably securing both lateral edges of each of said plate holders to said arrangement of structural spokes and radially extending gas feed conduits, at least one of said lateral edges being initially movable in a direction normal to the plane of said disk like member when its associated securing means is released so that when it is necessary to remove a porous plate from the disk like member the plate holder, its associated porous plates, and any other member defining said gas plenum can all be rotated simultaneously out of the plane of the disk like member, and the other lateral edge of said plate holder can then be disengaged from the disk like member.

27. The rotatable disk like member of claim 26 in which the lateral edge of each plate holder adjacent each main structural spoke carries a plurality of tabs, and the main structural spoke defines a plurality of complementary openings in which said tabs are received.

28. The rotatable disk like member of claim 26 in which the lateral edges of said plate holders located on laterally opposite sides of each of said radially extending gas feed conduits are initially movable in opposite directions normal to the plane of said rotatable disk like member when their associated securing means are released.

29. The rotatable disk like member of claim 28 in which said radially extending hollow gas feed conduits are enclosed except at their outer ends in supplementary rigid, hollow structural spokes of square external cross section, said supplementary structural spokes being affixed to said central hub plate and extending radially outward therefrom to said plate holders, said plate supporting portion at the outer end of each of said feed conduits projecting beyond said supplementary structural spokes, the edge of each of said plate holders adjacent each such plate supporting portion having a laterally extending flange, the flange on one of said plate holders being flush with the top surface of said disk like member and the flange on the other of said plate holders being flush with the bottom surface thereof, the rotatable disk like member also including means for releasably securing each of said plate holders to the plate supporting portion of its associated radially extending gas feed conduit.

30. The rotatable disk like member of claim 29 in which said last mentioned securing means includes means threadably securing each of said flanges to said plate supporting portion of its associated radially extending gas feed conduit.

31. The rotatable disk like member of claim 29 in which said last mentioned securing means releasably secures each of said outwardly extending flanges of one plate holder to the immediately adjacent plate holder.

32. A rotatable disk like member for use in a rotating gas diffuser for shearing fine gas bubbles from the surface of said disk like member when it is immersed in a body of liquid and rotated therein, which comprises:
a hollow central hub plate, said hub plate defining an inlet for the gas to be introduced into said body of liquid;
at least six main rigid structural spokes, each of said spokes being square in external cross section;
means for affixing said structural spokes to said central hub plate in positions extending radially outward therefrom;
an equal number of rigid hollow gas feed conduits;
means to affix each of said hollow gas feed conduits to said central hub plate in positions extending radially outward thereform between each pair of adjacent main structural spokes, said hollow conduits being operatively connected at their inner ends with said gas inlet and the outer portions of said conduits being closed;
a plurality of porous plates carried by said arrangement of main structural spokes and radially extending gas feed conduits, one of said plates being positioned between each radial feed conduit and the immediately adjacent main structural spoke lying on each side thereof on both the top and the bottom of the rotatable disk like member, each of said porous plates having the shape of a section of an annulus with its lateral edges aligned radially with said disk like member;
a plurality of plate holders carried by said arrangement of main structural spokes and radially extending feed conduits, one of said plate holders being located between each radially extending gas feed conduit and the immediately adjacent main structural spoke on each side thereof, each of said plate holders having a shape similar to the shape of its associated porous plates on the top and bottom of the rotatable disk like member, said plate holder and its associated porous plates defining a gas plenum extending only through an area substantially equal to the area of its said associated porous plates;
a plair of branch feed lines for each of said radially extending hollow gas feed conduits, one of said branch lines extending laterally on each side of said conduit, with one end of each branch line in operative connection with said feed conduit at a location spaced inward from the closed outer end portion of said conduit;
means operatively connecting the other end of each of said branch feed lines to the gas plenum defined by the top and bottom porous plates positioned on the respective sides of said feed conduit;

a plurality of tabs carried by the lateral edge of each of said plate holders adjacent each main structural spoke, said tabs being inserted in complementary openings defined by said structural spoke;

a supplementary rigid, hollow structural spoke of square external cross section enclosing each of said radially extending hollow gas feed conduits, said supplementary structural spoke being affixed to said central hub plate and extending radially outward therefrom to said plate holders, each of said radially extending feed conduits projecting beyond its associated supplementary structural spoke to form a plate supporting portion, the lateral edge of each of said plate holders adjacent each such plate supporting portion having a laterally extending flange, the flange on one of said plate holders being flush with the top surface of the rotatable disk like member and the flange on the other of said plate holders being flush with the bottom surface thereof;

releasable securing means for threadably securing each of said flanges to the plate supporting portion of its associated radially extending gas feed conduit;

skin means covering said arrangement of spokes, feed conduits, and affixing means to form an upper surface and a lower surface of said disk like member, said skin means extending between said central hub plate and said plurality of porous plates;

inserts formed of a foam material of closed cellular construction, said inserts being of a shape and size to substantially fill all spaces located between said upper and lower surface members radially inward of said gas plenums exclusive of the spaces occupied by the aforementioned structural elements of the rotatable disk like member;

a circular reinforcing hoop affixed to each of said radially extending structural spokes and hollow gas feed conduits immediately outward of said plurality of porous plates; and an annular member affixed to said arrangement of main structural spokes and hollow gas feed conduits radially outward of said porous plates, said annular member being formed of a lightweight material of relatively low density in comparison to the material of which said main structural spokes are constructed, said lightweight material being substantially resistant to the taking up of water, said annular member having a tapered cross section with its thickest portion positioned adjacent said porous plates.

whereby the introduction of gas into said gas inlet in said central hub plate when the disk like member is rotating about its axis of rotation while immersed in said body of liquid, will cause gas to flow through said feed conduits and branch feed lines into said gas plenums and out through said porous plates to produce nascent gas bubbles on the surface of said plates, which nascent bubbles are sheared off by the viscous shear forces exerted by said liquid as the disk like member rotates in said body of liquid, and when it is necessary to remove a porous plate from the disk like member, the lateral edge of each of said plate holders that carries said laterally extending flange can be moved initially in a direction normal to the plane of the disk like member when its associated securing means is released, the plate holder, the top and bottom porous plates, and any other member defining said gas plenum can all be rotated simultaneously out of the plane of the disk like member, and the other lateral edge of said plate holder can then be disengaged from the disk like member.

33. A rotatable disk like member for use in a rotating gas diffuser for shearing fine gas bubbles from the surface of said disk like member when it is immersed in a body of liquid and rotated therein, which comprises:

a hollow central hub plate, said hub plate defining an inlet for the gas to be introduced into said body of liquid;

at least three main rigid structural spokes;

means for affixing said structural spokes to said central hub plate in positions extending radially outward therefrom;

gas conduit means extending radially outward from said central hub plate to carry gas outward from said gas inlet;

a plurality of porous plates carried by said arrangement of main structural spokes and radially extending gas conduits on at least one of the top and bottom of said rotatable disk like member, each of said porous plates having the shape of a section of an annulus with its lateral edges aligned radially with said disk like member;

means defining a gas plenum underlying each of said porous plates on the surface of said rotatable disk like member, each of said gas plenums extending only through an area substantially equal to the area of its associated porous plates on at least one of the top and bottom of said disk like member;

feed line means to carry gas from said radially extending hollow gas conduit means to the gas plenum underlying each of said porous plates; and skin means covering said arrangement of spokes, gas conduit means, and affixing means to form an upper surface and a lower surface of said disk like member, said skin means extending between said central hub plate and said plurality of porous plates, whereby the introduction of gas into said gas inlet in said central hub plate, when the disk like member is rotating about its axis of rotation while immersed in said body of liquid, will cause gas to flow throgh said gas conduit means and feed line means into said gas plenums and out through said porous plates to produce nascent gas bubbles on the surface of said plates, which nascent bubbles are sheared off by the viscous shear forces exerted by said liquid as the disk like member rotates in said body of liquid.

34. The rotatable disk like member of claim 33 in which a plurality of said porous plates is carried by said arrangement of main structural spokes and gas conduit means on both the top and the bottom of the disk like member.

35. The rotatable disk like member of claim 33 in which all spaces located between said upper and lower surfaces of said disk like member radially inward of said gas plenums exclusive of the spaces occupied by the aforementioned structural elements of the rotatable disk like member are substantially filled with a lightweight material of relatively low density in comparison to the material of which said main structural spokes are constructed, said lightweight material being substantially resistant to the introduction of water into any space occupied thereby.

36. The rotatable disk like member of claim 35 in which said lightweight material is a form material of closed cellular construction

37. The rotatable disk like member of claim 33 in which said radially extending main structural spokes are square in external cross section to provide flat top and bottom surfaces of substantial area to which said skin means is affixed.

38. The rotatable disk like member of claim 37 in which each of said radially extending main structural spokes is solid and said gas conduits are separate, hollow members each of which is enclosed in a supplementary rigid, hollow structural spoke of square external cross section, said supplementary structural spokes being affixed to said central hub plate and extending radially outward therefrom, to provide additional flat top and bottom surfaces of substantial area to which said skin means is affixed.

39. The rotatable disk like member of claim 33 in which an annular member is affixed to said arrangement of main structural spokes and hollow gas feed conduits radially outward of said porous plates, said annular member being formed of a lightweight material of relatively low density im comparison to the material of which said main structural spokes are constructed, said lightweight material being substantially resistant to the taking up of water, said annular member having a tapered cross section with its thickest portion positioned adjacent said porous plates.

40. A rotatable disk like member for use in a rotating gas diffuser for shearing fine gas bubbles from the surface of said disk like member when it is immersed in a body of liquid and rotated therein, which comprises:

a hollow circular central portion, said central portion defining an inlet for the gas to be introduced into said body of liquid;

an annular portion immediately outward from said central portion, said annular portion defining gas conduit means extending radially outward from said central portion to carry gas outward from said gas inlet;

a plurality of porous plates carried by said annular portion on at least one of the top and bottom of said rotatable disk like member, each of said porous plates having the shape of a section of an annulus with its lateral edges aligned radially with said disk like member;

means defining a gas plenum underlying each of said porous plates on the surface of said rotatable disk like member, each of said gas plenums extending only through an area substantially equal to the area of its associated porous plates on at least one of the top and bottom of said disk like member;

feed line means to carry gas from said radially extending hollow gas conduit means to the gas plenum underlying each of said porous plates, whereby the introduction of gas into said gas inlet to said central hub plate, when the disk like member is rotating about its axis of rotation while immersed in said body of liquid, will cause gas to flow through said gas conduit means and feed line means into said gas plenums and out through said porous plates to produce nascent gas bubbles on the surface of said plates, which nascent bubbles are sheared off by the viscous shear forces exerted by said liquid as the disk like member rotates in said body of liquid.

41. The rotatable disk like member of claim 40 in which a second annular member is affixed to said first mentioned annular member, said second annular member being formed of a material substantially resistant to the taking up of water, and having a tapered cross section with its thickest portion positioned adjacent said porous plates.

42. A rotating gas diffuser for shearing fine gas bubbles from the surface thereof when the diffuser is immersed in a body of liquid and rotated therein, which comprises:

a hollow rotatable shaft, said shaft defining a main feed line for the gas to be introduced into said body of liquid;

at least three main rigid structural spokes;

means for affixing said structural spokes to said rotatable shaft in positions extending radially outward therefrom;

gas conduit means extending radially outward from said rotatable shaft to carry gas outward from said main gas feed line;

a plurality of porous plates carried by said arrangement of main structural spokes and radially extending gas conduits on at least one of the top and bottom of said gas diffuser, each of said porous plates having the shape of a section of an annulus with its lateral edges aligned radially with the rotating gas diffuser;

means defining a gas plenum underlying each of said porous plates on the surface of said gas diffuser, each of said gas plenums extending only through an area substantially equal to the area of its associated porous plates on at least one of the top and bottom of said gas diffuser;

feed line means to carry gas from said radially extending hollow gas conduit means to the gas plenum underlying each of said porous plates; and skin means covering said arrangement of spokes, gas conduits, and affixing means to form a disk like member having an upper surface and a lower surface, said skin means extending between said rotatable shaft and said plurality of porous plates, whereby the introduction of gas into said main feed line, when the gas diffuser is rotating about its axis of rotation while immersed in said body of liquid, will cause gas to flow through said gas conduit means and feed line means into said gas plenums and out through said porous plates to produce nascent gas bubbles on the surface of said plates, which nascent bubbles are sheared off by the viscous shear forces exerted by said liquid as the diffuser rotates in said body of liquid.

* * * * *